March 15, 1960

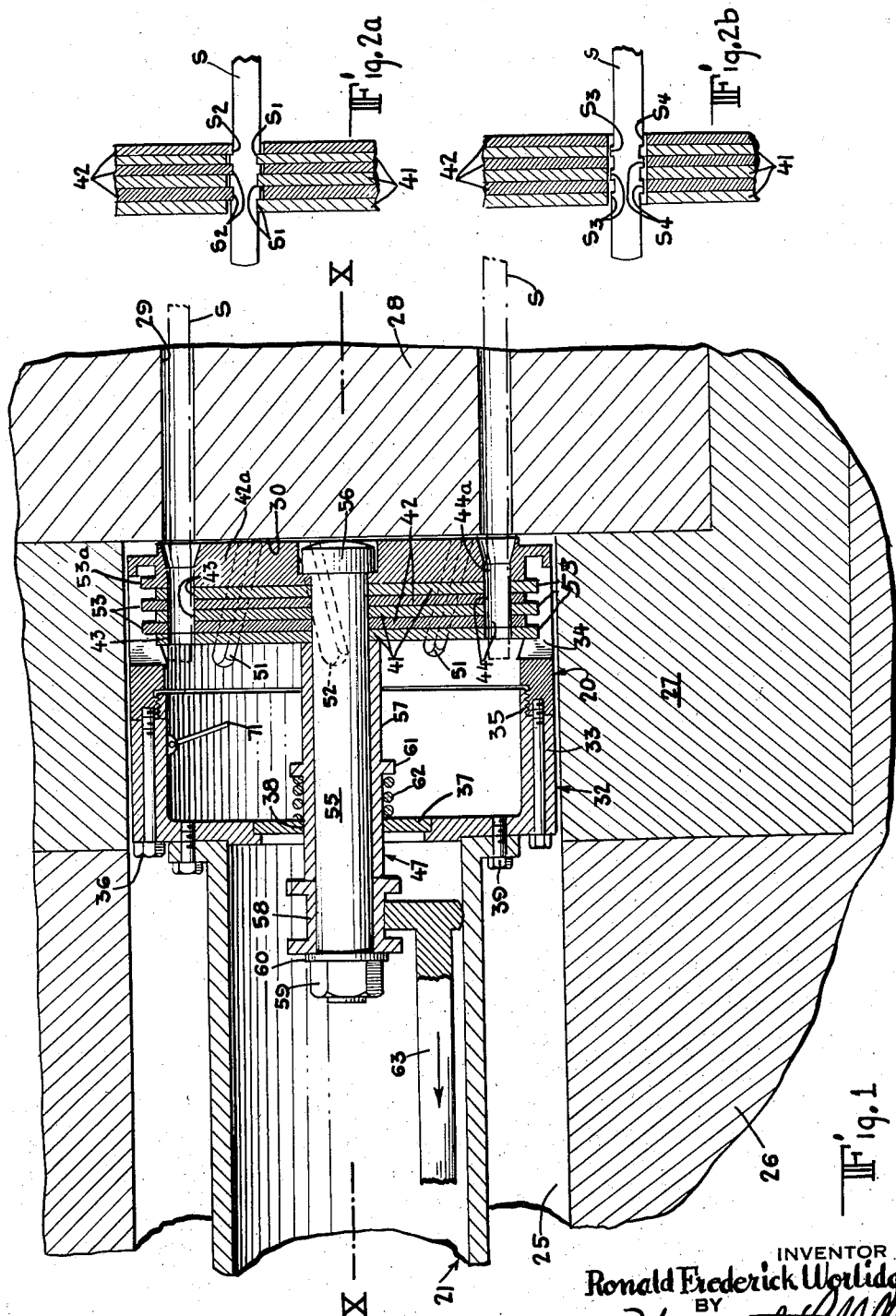

R. F. WORLIDGE 2,928,679

EXTRUSION PULL-OUT DEVICES

Filed Feb. 20, 1958

INVENTOR
Ronald Frederick Worlidge
BY
Hammond
ATTORNEYS

United States Patent Office 2,928,679
Patented Mar. 15, 1960

2,928,679

EXTRUSION PULL-OUT DEVICES

Ronald Frederick Worlidge, Lower Parkstone, England, assignor to The Loewy Engineering Company Limited, Bournemouth, England, a corporation of Great Britain Application February 20, 1958, Serial No. 716,456

Claims priority, application Great Britain February 21, 1957

7 Claims. (Cl. 279—1)

This invention relates to improvements in pull-out devices for metal extrusion presses which serve the purpose of assisting in the withdrawal of extruded articles from the press. They are particularly useful for multistrand extrusion where they have the advantage of preventing entanglement of one extruded strand with another and of ensuring that simultaneously extruded strands are all of the same length.

Known pull-out devices for metal extrusion presses comprise generally a carriage which can be traversed along the run-out table of the press, and a head mounted on the carriage and comprising sets of gripper jaws which are effective to engage the leading end of an extruded strand when the latter emerges from the press. Movement of the carriage away from the press at the appropriate speed with the strands clamped to the gripperhead, ensures that the strands are discharged from the press without any entanglement and with a predetermined tension maintained in the strands. It is desirable that the extruded strands are gripped by the pull-out device at a point situated as closely as possible to the exit of the die. This is particularly essential in the case of multi-strand extrusion.

Gripping of extruded strands at a point close to the exit of the extrusion die is a requirement which so far has not been fulfilled in any of the known pull-out devices. The strands, on emerging from the die, have to pass first through a tunnel inside the press before they reach the press outlet. The part of this tunnel adjacent or near the die is formed in those components of the die assembly which have to take a substantial portion of or all the pressure to which the die is subjected during an extrusion operation. This pressure is very considerable and it is therefore essential that the die components are not unduly weakened. It is therefore the usual practice to make the tunnel, at least along its end near the die assembly, not substantially wider than is necessary for the accommodation of all the strands which can be substantially extruded through one and the same die. Or, in other words, the diameter of the tunnel near the die does not substantially exceed the diameter of a circle circumscribing all sections which can be simultaneously extruded from the die. Known pull-out devices, and, in particular, their gripperheads, were too large and too bulky for entry into the tunnel extending between the die assembly and the outlet of the press, or at least between the narrow part of this tunnel. Gripping of the extruded strands could therefore take place only outside the press, after the strands have traversed the entire length of the tunnel.

It is an object of the invention to provide a pull-out device particularly for multi-strand extrusion having a gripper mechanism which is capable of gripping extruded strands at a point located near the die exit.

It is another object of the invention to provide in a pull-out device particularly for multi-strand extrusion presses gripper mechanism having a gripperhead which can be inserted into the tunnel for the extruded strands extending through the press from the die assembly to the press outlet.

For the better understanding of the invention, two embodiments thereof will be described in the following, by way of example, in conjunction with the accompanying drawings, in which:

Fig. 1 is a sectional elevation of a gripperhead and its actuating mechanism;

Figs. 2a and 2b show the gripper elements of the gripperhead in two positions;

Figure 3:
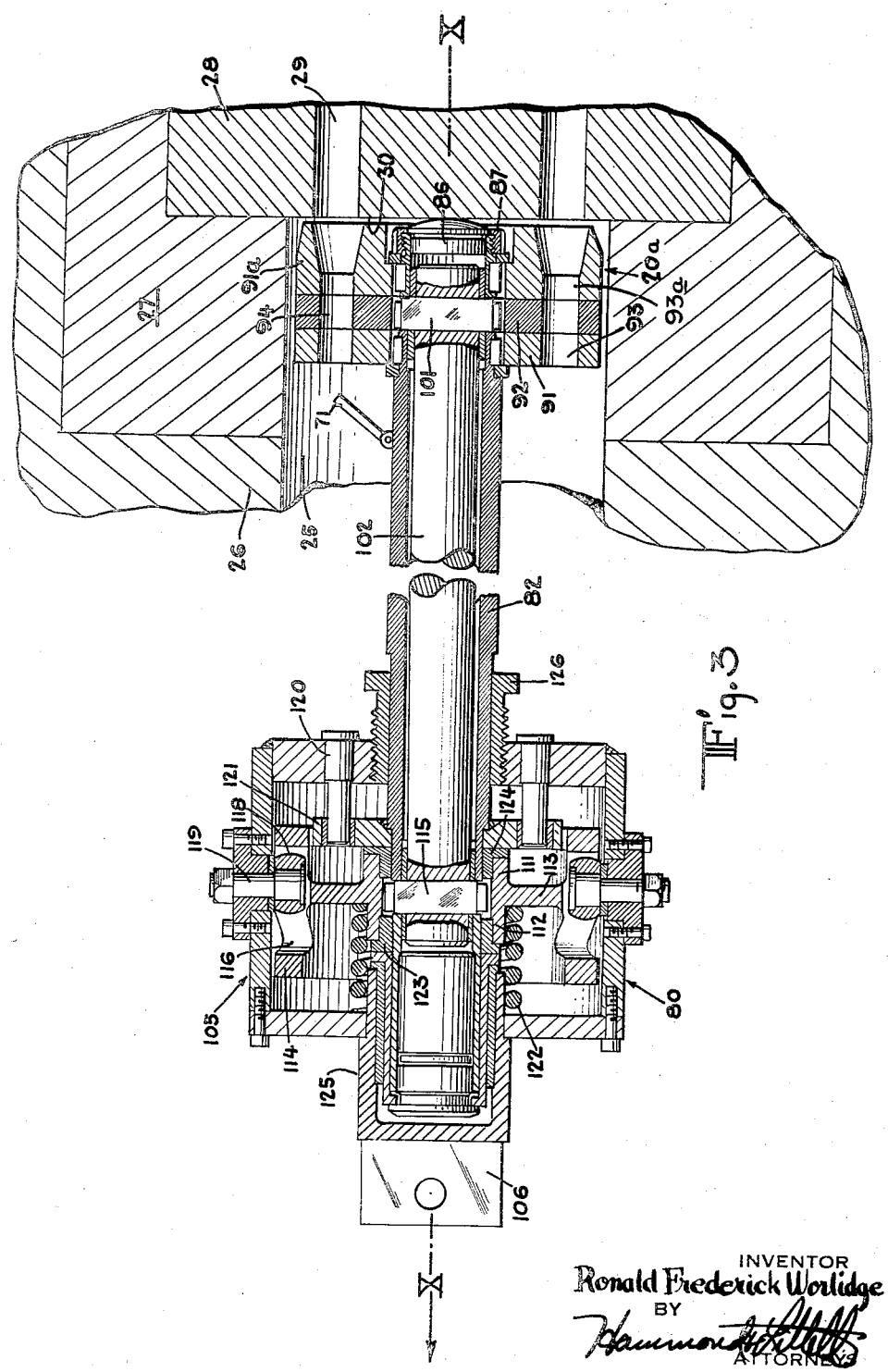
Fig. 3 is a sectional elevation of another embodiment of a gripper mechanism according to the invention.

The extrusion pull-out device shown in the embodiment of Fig. 1 comprises essentially a gripperhead assembly 20 carried in cantilever fashion at the end of a tubular structure 21. The latter is shown broken-away and it is adapted to be attached to a carriage, which is not shown since it does not form part of the present invention. It is sufficient to say that the carriage can be moved to and fro along a trackway, such as a run-out table, which extends from the outlet of an extrusion press in the direction of discharge of the extruded articles. This direction is indicated by an arrow on the left of Fig. 1 and is parallel to the main axis X—X of the press.

The gripperhead assembly 20 and the adjacent part of the tubular structure 21 are shown in Fig. 1 as being inserted into a tunnel 25 formed in components of the die assembly of the extrusion press, such as a bolster 26 and a distance-piece 27, it being understood that the tunnel extends further to the left of Fig. 1 through other parts of the press, not shown, including its platen. The tunnel 25 may be of different width along different parts of its length. However, the narrowest part will be that inside the aforementioned die components. The tunnel is closed at its end by a die backing ring 28 placed at the back of an extrusion die, not shown, the die having a plurality of apertures for the simultaneous extrusion of a plurality of strands. The backing ring 28 has a number of passageways 29 extending parallel to the axis X—X of the press, a passageway being arranged in registry with each extrusion aperture, the passageways being large enough to permit free travel therethrough of extruded articles. The backing ring 28 forms the end-wall of the tunnel 25.

The gripperhead assembly 20 is accommodated in a substantially barrel-shaped housing 32 consisting of two axially aligned parts 33 and 34 secured to each other by threads 35. The parts fit into each other with stepped seating surfaces so that both parts are centered in respect of each other, the correct angular position of one part relative to the other being ensured by such means as a locating peg or dowel pin 36. The housing 32 has an outer diameter slightly less than the diameter of the narrowest portions of the tunnel 25, so that the gripperhead can be moved through the full length of the tunnel as far as the end-face 30. This is the position shown in Fig. 1. The housing 32 is closed at its end remote from the end-face 30 by a cover 37 which has a central opening 38. The tubular structure 21 is secured to the housing 32 by any suitable means, such as threaded bolts 39.

The actual gripper mechanism consists of two sets of substantially circular plates 41 and 42 which have openings 43 and 44 for the extruded articles said openings being of substantially the same cross-section as the passageways 29 in the backing ring 28. Plates 41 of one set alternate with plates 42 of the other set, and the plates of both sets are stacked closely together and mounted at the end of a gripper plate carrier 47, presently to be described more in detail, so that the plates are co-axial with the axis X—X. In Fig. 1, the openings 43 and 44 are shown as being in alignment with each other and in registry with the passageways 29 in the backing ring 28. Normally, however, the openings 43 and 44 are slightly offset relative to each other. A gripper plate operating mechanism is provided for rotating the gripper plates of one set relative to those of the other set by a small angle about the axis X—X for the purpose of moving the openings 43 and 44 in and out of alignment.

The relative rotation of the two sets of plates 41 and 42 is used for anchoring the extruded strands S to the gripperhead 20 in the manner shown in Fig. 2a. It will be seen from this figure that the plates from the two sets penetrate from opposite sides slightly into the surface of the strand, thereby exerting a crimping action on the latter, and making indentations $s1$ and $s2$ therein. It is to be noted in this connection that extruded strands retain their plastic condition a short time after they have emerged from the die, and this is therefore the condition in which the strands will be while they pass through the openings 43 and 44, whereby deformation of the strands by the gripper plates is considerably assisted. The depth of the indentations $s1$ and $s2$ made by the gripper plates in the extruded strand need only be compartively small, of the order of a millimeter or even less. It is to be understood that the cross-section of the openings 43 and 44 must be slightly in excess of the cross-section of the strands S in order to allow free movement of the strands through these openings with protrusions $s3$ and $s4$ formed between the indentations $s1$ and $s2$, as shown in Fig. 2b.

The relative rotation of the plates of both sets may be obtained either by rotating the plates of one set only and leaving those of the other stationary, or by rotating the plates of both sets in opposite directions. In the case of the present embodiment of Fig. 1, a gripper plate operating mechanism is provided in the gripperhead assembly 20 for effecting relative rotation of both sets of plates in opposite directions.

The gripper plate operating mechanism includes two sets of cam tracks in the form of helical or spiral grooves 51 and 52 which are of opposite hand, the grooves of one set, for instance 51, being engaged by lugs or followers 53 formed on the plates 41 and the grooves 52 of the other set being engaged by lugs or followers 53 on the plates 42. The grooves are formed in the inside of the housing part 34, and it will be apparent that upon axial movement of the sets of plates 41 and 42 relative to the part 34, contiguous plates are rotated in opposite directions, whereby the openings 43 and 44 are off-set relative to each other, as shown in Fig. 2a. The grooves 51 and 52 are inclined relative to the axis X—X at a small angle, so that axial displacement of the sets of plates 41 and 42 relative to the part 34 results in a still smaller angle of relative rotation between the two sets of plates 41 and 42.

The gripper plate operating mechanism includes the gripper plate carrier 47 which is so arranged that it is capable of a short axial displacement relative to the housing 32, as will be presently described. The gripper plate carrier means comprises essentially carrier 47 and an actuating pin 55 which is so mounted in the housing 32 as to be axially slidable relative thereto. The sets of plates 41 and 42 are mounted at the end of the actuating pin 55 which faces the end-wall 30. The actuating pin has a domed head 56 which normally protrudes beyond the housing 32. The set of plates 42 includes an endmost plate 42a which may be somewhat thicker than the other plates, as shown, and it may have a recess in its center for accommodating the head 56. The openings 44a in this plate may be flared at their ends facing the backing ring 28, so as to facilitate the entry of the extruded strands S. A tubular sleeve 57 is arranged on the actuating pin 55 next to the sets of plates 41 and 42 and in abutting relationship thereto. Next to the sleeve 57 is a collar 58 having an annular groove and defining with said tubular sleeve 57a tubular sleeve assembly. Threaded at the end of the actuating pin 55 is a nut 59 with a washer 60. The sleeve 57 is formed with a shoulder 61 which serves as an abutment for a spring 62 inserted between the shoulder 61 and the cover 37. The opening 38 in the cover is provided for the entry therethrough of the actuating pin 55 and the sleeve 57.

It will be seen that normally the sleeve 57 and the sets of plates 41 and 42 are held in end-wise abutting relationship with each other and with the head 56 by means of the spring 62 and that axial displacement of the plates, the sleeve and the collar on the arbor is prevented by the head 56 and the nut 59. It is also possible to make the actuating pin, the sleeve and the collar (or tubular sleeve assembly) in one piece, in which case the nut 59 can be eliminated. However, the arrangement shown and described here has the advantage of an easier assembly. A forked actuating rod 63 is adapted to enter the annular groove of the collar 58, the rod being only partly shown and the forked actuating rod 63 is adapted to be moved in a direction parallel to that of the axis X—X, whereby the gripper plate carrier 47 can be displaced relative to the housing 32. The displacement of the rod 63 relative to housing 32 may either be effected manually by an operator or mechanically by arresting movement of housing 32 through a stop arranged at a suitable point on the trackway of the pull-out device and then pushing head 56 to force the head 56, the tubular sleeve assembly and the sets of plates 41 and 42 back against the action of the spring 62. The device according to the invention operates as follows:

The gripperhead assembly 20 is inserted into the tunnel 25 to the extent that the head 56 makes contact with end-face 30. The movement of the housing 32 is continued a short distance beyond that point until it is stopped by the spring 62 having attained its maximum degree of compression, or by any other means. There is, therefore, a short relative axial movement between the housing 32 and the gripper plate carrier 47, as well as the sets of plates 41 and 42. This results, as described above, in a relative rotation of the sets of plates 41 and 42 by an angle determined by the slope of the grooves 51 and 52. While the gripperhead assembly 20 is in its normal retracted position the head 56 is out of contact with the end-face 30 and the plates 41 and 42 assume a position as shown in Fig. 2a in which their openings are off-set relative to each other. A short relative movement between housing 32 and the sets of gripper plates 41 and 42 carried by the gripper plate carrier 47, is effective to move said sets of plates 41 and 42 into the release position shown in Figs. 1 and 2b. The gripper plates are therefore ready to receive the extruded strands S which emerge from the die and travel through the passageways 29 in the backing ring 28. As soon as the front ends of the extruded strands have passed through all the gripper plates, the gripperhead assembly 20 is retracted by the carriage of the pull-out device, whereby the head 56 is moved out of contact with the end-face 30 and the parts mounted on the actuating pin 55, including the sets of plates 41 and 42, are free to move to the right, thereby causing a relative axial movement between the plates and the housing 32 which results in a relative rotation of the plates into their gripping positon. The extruded strands are crimped, as shown in Fig. 2a, and thereby firmly anchored to the gripperhead. During the subsequent extrusion operation, the gripperhead is pulled away from the press by its carriage with the extruded strands firmly clamped to the head and preferably placed under a certain tension, as well-known. At the end of the extrusion stroke, the pull-out device is brought to a standstill, and the gripper plates 41 aund 42 again moved into their release position by an axial displacement of the plates relative to the housing 32. This displacement can be effected by pulling the actuating rod 63 to the left in Fig. 1, relative to the housing 32 while the housing 32 is abutted against the stop earlier described.

In multi-strand extrusion, it sometimes occurs that strands which are simultaneously extruded do not advance uniformly, and it can therefore happen that some of the strands have moved further along in the openings 43 and 44 of the plates than others. In order to give the operator of the press a signal to the effect that all extruded strands have passed through the gripper plates 41 and 42, an indicating device may be provided comprising flag switches or blades 71, arranged in the path of the extruded strands and immediately behind the gripper plates. These flag switches may be connected to any suitable signals outside the press, located, for instance, at the central control pulpit of the press. If desired, the indicating means may be interlocked with the drive of the pull-out device, so that the pull-out device cannot be moved away from the press before all extruded strands have been securely gripped in the gripperhead.

The embodiment shown in Fig. 3 differs from that previously described in that the operating device for rotating the gripper plates is separated from the plates themselves. The pull-out device shown in Fig. 3 has therefore a gripperhead assembly 20a and a gripper plate operating mechanism 80 spaced apart from each other.

The gripper plate operating mechanism 80 is connected to each of the gripper plates by a substantially tubular structure 82. The gripper plate operating mechanism is attached by a chain or cable to a carriage of suitable design, not shown here, since it does not form part of the present invention. It suffices to say that it can be moved to and fro along a trackway, such as a run-out table, which extends from the outlet of an extrusion press in the direction of discharge of the extruded articles. This direction is indicated by an arrow on the left of Fig. 3, and is parallel to the main axis X—X of the press.

The gripperhead assembly 20a is adapted to be entered into a tunnel 25 formed in components of the die assembly of an extrusion press, such as a bolster 26 and a distance-piece 27. The tunnel is closed at its end by a die backing ring 28 placed at the back of an extrusion die, not shown, the die having a plurality of apertures for the simultaneous extrusion of a number of strands. The arrangement is therefore similar to that described with reference to Fig. 1. Here again the backing ring has a plurality of passageways 29 extending parallel to the axis X—X of the press, the passageways being arranged in registry with related extrusion apertures and large enough to permit free travel therethrough of extruded articles. The backing ring 28 forms the end-wall 30 of the tunnel 25.

The gripperhead assembly 20a comprises two sets of substantially circular gripper plates, the first set consisting of two plates 91 and 91a and the second set merely of a single plate, 92. The plates 91, 91a and 92 have openings 93, 93a and 94 respectively which have substantially the same cross-section as the passageway 29 in the backing ring 28. The openings 93a in the plate 91a are flared, so as to facilitate the entry of the extruded strands. The plate 92 is arranged intermediate the plates 91 and 91a and all three plates are stacked closely together and so mounted in the gripperhead that they are co-axial with the axis X—X of the extrusion press. In Fig. 3, the openings 93, 93a and 94 are shown as being in alignment with each other and in registry with the passageways 29 in the backing ring 28.

The plates 91 and 91a are keyed to the tubular sleeve assembly 82, while the plate 92 is keyed to a transverse pin 101 which passes across an actuating rod 102 so as to be secured thereto. The actuating rod 102 passes through the tubular structure and extends into the operating head 80. The tubular sleeve assembly 82 is closed at its end facing the press by a plug 86 secured thereto by any suitable means, such as a retaining ring 87, and having a domed surface adapted to engage with the end-wall 30. The actuating rod 102 and sleeve assembly 82 with associated elements 111, 123, 124, 125 and 126 form "carrier means" hereinafter so referred to in the claims as supporting the gripper plates 91, 91a and 92.

As in the case of the previously described embodiment, both sets of gripper plates are rotatable relative to each other by a small angle, whereby their respective openings 93, 93a and 94 are either off-set with respect to each other, or moved in alignment with each other. When off-set, the openings 93 and 94 exert a crimping action on the extruded strands which enter the openings after emergence from the passageways 29. The crimping action serves, as in the previously described example, the purpose of anchoring the extruded articles to the gripperhead, and the extruded strands are formed with indentations and protrusions similar to those shown in Figs. 2a and 2b. Relative rotation of the two sets of plates is again effected by the inter-action between axially movable elements and cam tracks.

The tubular sleeve assembly 82 and the actuating rod 102 are shown in Fig. 3 as extending into a housing 105 forming part of the gripper plate operating mechanism 80, the housing being fitted at its side remote from the gripperhead with means 106 for the attachment of a pulling element, such as a cable which connects the gripper plate operating mechanism to the carriage of the pull-out device.

The actuating rod 102 carries at its end inside the housing 105 an annular member 111 which consists of a hub 112, a web 113, and a rim 114. The hub 112 is secured to the rod 102 by a cross pin 115, whilst the rim 114 is formed with one or more cam tracks 116. The cam tracks are adapted to be contacted by one or more rollers or followers 118 which are loosely mounted on pins 119 projecting into the inside of the casing 105. The tubular structure 82 is held against rotation relative to the housing 105 by means of a number of guide pins 120 arranged with their axes parallel to the axis X—X. The guide pins 120 extend into a flange 121 secured to the tubular structure 82. A spring 122 is inserted between an end-wall of the housing 105 and the web 113, urging the annular member 111 and thereby also the actuating rod 102 and the tubular sleeve assembly 82 in a direction towards the press. The hub 112 of the annular member 111 is supported by means of two spacer sleeves 123 and 124, which have shoulders at their ends engaging in the position shown in Fig. 3 with the flange 121 and with the end of an inwardly projecting boss member 125 forming part of the housing 105.

It will be seen from the foregoing that the tubular sleeve assembly 82 and the actuating rod 102, as well as all parts connected thereto, including the gripper plates 91 and 92, can be moved axially relative to the housing 105 by a short distance determined by the distance between the flange 121 and a sleeve 126 threaded into the wall of the housing 105 near the gripperhead. The degree of axial movement between the aforesaid parts can therefore be varied by screwing sleeve 126 into and out of the housing 105, the sleeve being provided to this end with a knurled head.

In the present example, only the gripper plate 92 is rotatable, whilst the gripper plates 91 and 91a are held against rotation through their being secured to the tubular structure 82 which, in turn, is prevented from rotating by the guide pins 120. Rotation of the gripper plate 92 is effected during the axial movement of the actuating rod 102 and the annular member 111 relative to the housing 105, whereby the cam tracks 116 are moved past the followers or rollers 118, the slope of the cam tracks being such as to bring about the required relative rotation between the plates 91, 91a and 92 during axial movement of the actuating rod 102.

The operation of the gripperhead assembly 20a and the gripper plate operating mechanism 80 is substantially the same as described in connection with the embodiment of Fig. 1.

In Fig. 3, the gripperhead assembly and the gripper plate operating mechanism are shown in their most advanced positions, with the domed surface of the plug 86 in contact with the end-wall 30. The casing 105 is shown as being pushed to the right, its movement being arrested by the shoulder on the spacer sleeve 123. The rollers 118 are then at the right-most position on the cam tracks 116. In this position, the openings 93 and 94 of the gripper plates 91 and 92 respectively are in registry with each other and with the pasageways 29 in the die backing ring. The extruded strands can therefore pass freely through these openings. As soon as the operator has received a signal to the effect that all extruded strands have passed through the full length of the openings 93 and 94, which may be ensured by flag switches or signal means 71a, similar to those shown in connection with Fig. 1, the pull-out device is withdrawn from the extrusion press. At the beginning of this movement, the plug 86 is moved out of contact with the end-wall 30, and the actuating rod 102 and the tubular sleeve assembly 82, as well as all parts connected therewith, are free to follow the action of the spring 122 and moved to the right in Fig. 3. The cam tracks 116 move along the rollers 118 and thereby rotate the actuating rod 102 together with the plate 92, whereby the openings 93 and 94 are off-set relative to each other and a crimping action exerted on the extruded strands, whereby the latter are firmly clamped to the gripperhead 20. At the end of the stroke of the pull-out device, the casing 105 is moved relative to the tubular sleeve assembly 82 and the actuating rod 102, in a direction opposite to the previous one, either by hand or by abutting the housing 105 against a stop, not shown, and arranged at a suitable point in the path of the casing and then pushing plug 86 to thereby push actuating rod 102 and then rotate the gripper plate 92 relative to the plates 91 and 91a by an angle sufficient to bring the openings 93 and 94 in alignment, and thus permit withdrawal of the strands from the gripper plates.

In the case of the embodiment shown in Fig. 3, the gripper plate operating mechanism 80 does not have to enter the tunnel 25 and there are, therefore, no dimensional restrictions imposed on the gripper plate operating mechanism by the minimum width of the tunnel. The width of the tunnel determines merely the maximum diameter of the plates 91 and 92.

The invention is capable of other embodiments than those shown and described with reference to the accompanying drawings. It is possible, for instance, to vary the number of gripper plates, both in the case of the arrangements of Fig. 1 and Fig. 3.

What is claimed is:

1. A reciprocable gripper mechanism for pulling multistrand extrusions comprising a plurality of coaxial and contiguous gripper plates having extrusion receiving apertures normally out of register with each other, a gripper plate operating mechanism including carrier means for supporting said gripper plates, and a housing surrounding at least one end of said carrier means, said carrier means having said one end mounted in said housing for sliding movement relative thereto along an axis substantially parallel to the axes of said extrusions to move from a first position to a second position, said gripper plate operating mechanism further including cam means comprising a follower and a cam track provided in the wall of said housing, said cam track being inclined relative to said axes, said follower sliding in said cam track and being connected to at least one of said gripper plates for angularly reciprocating said one gripper plate relative to the others of said gripper plates to bring said extrusion receiving apertures of all said gripper plates into register when said carrier means lies in said second position in said housing thereby permitting insertion of said extrusions in said registering extrusion receiving apertures and to bring said extrusion receiving apertures of all said gripper plates out of register when said carrier means is moved away from said second position upon movement of the gripper mechanism thereby gripping the ends of said extrusions within said apertures of said gripper plates.

2. A reciprocable gripper mechanism constructed in accordance with claim 1, wherein said carrier means includes an actuating rod having an end to which said one gripper plate is attached and a sleeve assembly surrounding said actuating rod and to which said other gripper plates are attached.

3. A reciprocable gripper mechanism constructed in accordance with claim 2, wherein said carrier means further includes a spring surrounding said sleeve assembly and abutting between a flange provided on said asesmbly and the wall of said housing to bias said carrier means in said first position relative to said housing.

4. A reciprocable gripper mechanism constructed in accordance with claim 1, wherein said gripper plates are enclosed in said housing and said follower comprises at least one lug provided on said one gripper plate and engaging said cam track to rotate said one gripper plate during sliding movement of said carrier means between said first and second positions thereof relative to said housing.

5. A reciprocable gripper mechanism constructed in accordance with claim 1, wherein said follower consists of at least one roller provided at said one end of said carrier means and engaging said cam track to rotate said one gripper plate during sliding movement of said carrier means.

6. A reciprocable gripper mechanism constructed in accordance with claim 1, wherein said carrier means includes a spring extending between said carrier means and said housing to bias said carrier means in said first position.

7. In a reciprocable gripper mechanism for pulling extrusions from an extrusion press having a bolster with an extrusion receiving tunnel therein and a die backing ring for an extrusion die, a reciprocable gripper for gripping and pulling extrusions issuing from said die backing ring out of said tunnel comprising a gripper head, means to advance said gripper head through said tunnel to a position adjacent said die backing ring, gripping means in said gripper head, means to move one portion of said gripping means relative to another portion while the gripper head is inside said tunnel to grip extrusions issuing from said die backing ring inside said tunnel and adjacent the extrusion exit side of said die backing ring and means to withdraw said gripping means from said tunnel to pull the extrusions out of said press.

References Cited in the file of this patent

UNITED STATES PATENTS

| 1,825,026 | Thomas | Sept. 29, 1931 |
| 2,158,814 | Ashcraft | May 16, 1939 |
| 2,720,310 | Yack et al. | Oct. 11, 1955 |

FOREIGN PATENTS

| 504,694 | Italy | Dec. 13, 1954 |